(12) United States Patent
Abrol et al.

(10) Patent No.: US 7,212,538 B2
(45) Date of Patent: May 1, 2007

(54) DIFFERENTIAL ACK PROCESSING BUFFER MANAGER AND METHOD THEREFOR

(75) Inventors: Nischal Abrol, San Diego, CA (US); Sandeep Singhai, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 803 days.

(21) Appl. No.: 10/655,691

(22) Filed: Sep. 5, 2003

(65) Prior Publication Data
US 2005/0053084 A1    Mar. 10, 2005

(51) Int. Cl.
*H04L 12/28* (2006.01)
(52) U.S. Cl. .................. 370/412; 370/428; 370/429
(58) Field of Classification Search ............... 370/412, 370/428, 429, 363, 368, 371, 374, 378, 381, 370/383, 395.71
See application file for complete search history.

(56) References Cited

U.S. PATENT DOCUMENTS

| | | | | |
|---|---|---|---|---|
| 6,046,817 | A * | 4/2000 | Brown et al. | 358/1.16 |
| 6,078,733 | A * | 6/2000 | Osborne | 709/250 |
| 6,411,620 | B1 * | 6/2002 | Takase et al. | 370/390 |
| 6,553,032 | B1 | 4/2003 | Farley et al. | |
| 7,093,043 | B2 * | 8/2006 | Tan et al. | 710/104 |
| 2001/0036154 | A1 | 11/2001 | Takagi | |
| 2002/0156936 | A1 * | 10/2002 | Burgess | 709/328 |
| 2003/0035438 | A1 | 2/2003 | Larsson | |
| 2003/0161280 | A1 | 8/2003 | Gruhn et al. | |
| 2004/0223504 | A1 * | 11/2004 | Wybenga et al. | 370/412 |
| 2005/0055406 | A1 * | 3/2005 | Singhai et al. | 709/206 |

OTHER PUBLICATIONS

Automatic-repeat-request stragtegies. XP-002309572, Chapter 15, pp. 458-470.

* cited by examiner

*Primary Examiner*—CongVan Tran
(74) *Attorney, Agent, or Firm*—Thomas Rouse; Charles D. Brown; Donald C. Kordich

(57) ABSTRACT

Communication methods, buffer management methods, communication systems, and communication devices for mobile communications using acknowledgement-based protocols, such as TCP. Communication buffer memory includes free and committed memory, with copies of transmitted messages awaiting acknowledgement stored in committed memory of transmit buffer. Memory controller monitors communication buffer state and, if free memory is less than a memory threshold, controller extracts TCP ACK-NUM from a received host message. The TCP ACKNUM acknowledges transmitted message copies having ACK-NUMs of lesser ordinality, and memory controller identifies and denominates the committed memory storing acknowledged messages as free memory, potentially avoiding deadlock.

36 Claims, 3 Drawing Sheets

DIFFERENTIAL ACK PROCESSING BUFFER MANAGER AND METHOD THEREFOR

FIELD OF THE INVENTION

The invention herein is related to telecommunication systems, particularly to wireless communications devices, and most particularly to memory-constrained communications devices.

BACKGROUND

Increasingly, mobile wireless devices communicate messages over heterogeneous connections, in which one or more constituent links include a public network, such as the Internet. The Internet is a loosely-organized international collaboration of autonomous, interconnected, packet-based networks, including wireless networks, which can be represented by a hierarchical, multilayer architecture, service descriptions, and protocols. Communication endpoints, or hosts, can be interconnected over a network using intermediate packet-switching computers called routers. To communicate using the Internet, a host typically implements a protocol from at least one layer of a hierarchical Internet protocol suite. Each host and router executes one or more programs, or processes, which perform various tasks including information communication, processing, and display. An application can be a process that often operates at the topmost layer of the Internet protocol suite, and that may use a lower-layer transport protocol to provide transport layer communication services across distinct, but interconnected, networks. In turn, a transport protocol typically employs a network protocol to facilitate message transfer over a network between communicating processes. At the lowest layers, messages can be logically and physically transformed, and transported as electromagnetic or electro-optic signals through the networking media.

Numerous communication protocols exist, with some protocols being well suited for use with inter-networked communicating processes. For example, a full-duplex protocol can be advantageous because it permits essentially concurrent communication between connected hosts. Another protocol distinction may lie in whether a protocol is connection-oriented (end-to-end) or connectionless (stateless). In an end-to-end protocol, a connecting circuit, or bidirectional logical connection, typically is established prior to communication between the endpoint hosts. Also, connection-oriented protocols typically invest responsibility for communication integrity, security, and flow management in the communicating hosts, and not in intermediate computers or routers. Nevertheless, such protocols can be disrupted by delays or interruptions in one of the intermediate links or routers, which connect the hosts. To improve robustness of the communication system, routers often use connectionless network-layer protocols, which forward each message, or data unit, independently of others. In general, a stateless protocol offers no end-to-end message delivery guarantees. Independently transmitted messages may be forced to contend for the use of network resources as they are routed through the network. These messages may arrive at the destination host damaged, duplicated, out of order, or not at all. Thus, higher-layer processes, such as an application or a transport-layer process, typically would assume responsibility to correctly receive, reorder, repair, acknowledge receipt of, and request re-transmission of, the segments, or messages, conveyed by the connectionless protocol.

A connection-oriented protocol may be described as "reliable" if it includes a mechanism by which sender and receiver exchange information, directly or indirectly, about a communication state, such as a message delivery. Generally termed an "acknowledgement," or ACK, the mechanism may involve a variety of techniques, such as a formatted response, to convey the information desired for a given protocol. In sender-initiated acknowledgement protocols, each communicating host, whether client or server, may retain a copy of transmitted messages for possible re-transmission until the corresponding receiving endpoint ACKs the particular message. When the recipient acknowledges receipt, the sender may release the memory locations in which the retained copies are stored. If a proper acknowledgement is not received, the sending endpoint may retransmit messages beginning at the point of the last proper ACK. In typical communications, multiple messages may be transmitted, with each host accumulating copies of sent messages until corresponding ACKs are received. There may be a risk that either, or both, host may temporarily become overwhelmed by the number of segments being stored, processed, received, and transmitted at a given time. This risk may be grounded in numerous sources, for example, the bursty nature of Internet communications, the ACK-related retention of previously transmitted messages, and the ability of hosts to transmit multiple messages.

A popular group of protocols used on the Internet is the Transmission Control Protocol/Internet Protocol (TCP/IP) protocol suite. The Transmission Control Protocol (TCP) is an end-to-end, full-duplex, transport protocol providing reliable inter-process communication between pairs of host computer processes. Using TCP, a message can be communicated using one or more formatted data units, called TCP segments. In addition to being a connection-oriented protocol, TCP further assures message delivery by employing message error detection and message receipt acknowledgements. Error detection can be in the form of a checksum, which usually corresponds to the data of, and can be incorporated into a respective TCP segment. Internet Protocol (IP) is a robust, connectionless network protocol, in which each message segment can incorporate identification information, including IP addresses for source and destination hosts. Using a destination host address, the IP protocol may route subsequent segments over multiple paths to increase the likelihood that a message, which includes one or more TCP segments, will reach the destination host intact, on time, and in order. TCP-like protocols may be used in conjunction with IP-like protocols to add a mechanism by which sender and receiver exchange information about the segments conveyed by the connectionless protocol, and by which reliable message exchange can be established. TCP message receipt acknowledgement generally uses positive acknowledgement-based, sender-initiated controls, which also may provide the communicating hosts with message sequencing information, host message or channel capacity, and so on. Implicitly, although TCP/IP can be a reliable, robust communication protocol suite, the actual flow of segments during communications may be bursty, that is, subject to wide variations in the volume of packets being transmitted at a given moment.

When an application program, or process, (e.g., HTTP) communicates with another host using TCP/IP-like protocols, the transport-layer processes (e.g., TCP) on either endpoint connect with the respective application using a logical device called socket. A TCP socket may include an IP address and a TCP port number. Typically, the IP address can be associated with the host, and the TCP port number can be associated with a particular communication function of the particular process invoking the host transport process. By directing messages through a specific local host socket to a specific remote socket, a local host may be capable of communicating across a network with the remote host. A communication buffer may be allocated at each endpoint of a TCP connection, as a TCP connection is established. Each communication buffer on each host may include one or more transmit buffers and receive buffers. An exemplary BUFFER READ can be an operation in which data is transferred from a buffer to an executing application (process). An exemplary BUFFER WRITE can be an operation in which data is transferred from a process to a buffer. During a communication, a remote host can function as a server to a client local host, and vice versa, with roles changing during the course of a communication. With full-duplex communications, hosts may communicate messages concurrently. However, a client or a server often cannot perform two transactions internally at once—for example, a BUFFER READ cannot be performed on a host buffer concurrently with a BUFFER WRITE, and vice versa. This aspect also may lend to a host being temporarily overwhelmed, for example, during a period of high message volume.

Relative to other communication systems, mobile devices often can be memory-constrained, with limited available communication memory space. Such constraints may adversely affect flow control and buffer management under some conditions. For example, memory-constrained devices may be susceptible to message flow anomalies such as buffer deadlock and buffer starvation. Buffer deadlock may arise when only one process at a time can use a buffer; when the process holding a buffer will release it only voluntarily, and after it has completed its task; when a first process holding a buffer is waiting to acquire additional buffers held by a second process; and when the second process is waiting to acquire additional buffers held by the first process. Buffer starvation may occur where an active, or high priority, first process consumes nearly all available buffers, thereby blocking a temporarily inactive, or low priority, second process, which waits for the buffers held by the first process to be released.

Certain mobile device processes may be configured to defer performing a BUFFER READ operation on a communication buffer until an in-progress BUFFER WRITE operation has completed. As such application processes execute, stored TCP segments can accumulate in both transmit and receive buffers of the mobile device, leading to exhaustion of the available communication memory space. With the memory space exhausted, the process may be unable to complete an in-progress BUFFER WRITE while, at the same time, it awaits the completion of the BUFFER WRITE to perform a BUFFER READ operation. Also, a mobile device process may execute a high message volume operation, which temporarily exhausts available communication memory space, and which leads other processes and operations to face buffer starvation. Typically, for some period after a buffer deadlock or a buffer starvation develops, the mobile device halts communication, while keeping open the TCP connection. Many TCP protocols and processes can provide timeout mechanisms, in which the TCP connection between the mobile device and the server can be closed after a predetermined timeout period.

This recovery technique can be inefficient because the timeout period may be on the order of several seconds. For a mobile user, buffer deadlock, buffer starvation, default TCP recovery mechanisms, and host overload during a period of high message volume, may lead to a reduced, and unsatisfactory, perceived Quality of Service. In the aggregate, these factors are of a type that can waste substantial mobile system resources. Thus, it is desirable to manage host resources, such that the impact of such factors may be reduced, or substantially eliminated.

SUMMARY

The present invention provides communication methods and communication buffer management methods, along with communication systems and communication devices, such as mobile communication devices. The communication methods and communication buffer management methods can be advantageous for a local host, which uses a message protocol and has a communication buffer with a predetermined number of memory locations. Within the communication buffer may be copies of transmitted messages having transmitted message identifiers. Memory designated as committed memory may be write-inhibited, and memory designated as free memory may be write-enabled. The selected memory locations associated with the stored transmitted message copies may be denominated as committed memory. Memory locations not denominated as committed memory may be denominated as free memory.

Methods include receiving a received message from a remote host; determining whether a local host communication buffer is in a predetermined buffer state; and, if the communication buffer is not in the predetermined buffer state, to routinely process received messages and receive additional messages from the remote host. However, if the communication buffer is in the predetermined buffer state, then designating the received identifier in the received message as a release identifier; using the release identifier to locate associated copies of transmitted messages; and denominating the associated copies as free memory. The predetermined buffer state may be the number of free memory being less than a predetermined memory threshold. Where the received message includes a header and a payload, the method includes extracting the received identifier from the header, in which the received identifier has a defined relationship to a transmitted message identifier stored in committed memory. The received message can be unacknowledged, such as returning no ACK to the remote host, or acknowledged by sending an ACK with an ACK-NUM having an ordinality of less than that of the received message. Also, the payload of the received message may be discarded. The received and transmitted message identifiers each can be defined over an ordered, numerical sequence. The defined relationship between the received identifier and the transmitted message identifiers can be such that the transmitted message identifiers have an ordinality of less than the ordinality of the received identifier.

The message protocol can be a response-type, reliable, end-to-end message protocol, including acknowledgement-based protocols, such as a positive acknowledgement-based (ACK) Transmission Control Protocol (TCP) based protocol. Where TCP is the message protocol, the release and transmitted message identifiers may be TCP acknowledgement sequence numbers (ACKNUM), such that, when the ordinality of the received message ACKNUM identifier is greater than the ordinality of transmitted message ACK-NUM identifiers, transmitted message copies stored in committed memory the communication buffer may be denominated as free memory. The communication buffer may be further allocated into transmit and receive buffers. A transmit buffer can be managed using the present method, and a receive buffer may be managed using the present method.

Apparatus include a communication system and mobile communication device having a communication buffer and a memory controller connected with the buffer. The buffer has a predetermined number of memory locations consisting of free memory and committed memory. A message transmitted from the mobile communication device to a recipient across a communication network may be stored in a selected free memory location, as a transmitted message copy. A transmitted message copy includes therein a corresponding transmitted message identifier. The memory controller can discern from the transmitted message identifier whether to denominate the selected free memory location in which the transmitted message copy may be stored as a selected committed memory location. The communication buffer can be allocated as a transmit buffer including committed transmit memory, free transmit memory, or a combination thereof. Transmitted message copies having corresponding transmitted message identifiers may be stored in committed memory. The memory controller may be configured to examine a received message identifier in a received message from the remote host. The memory controller may monitor the transmit buffer, and may be configured to identify committed transmit memory storing transmitted message copies with transmitted message identifier associated with the received message identifier.

The memory controller can include a memory counter, a commit directory, a mapper, and an analysis register. When the predetermined buffer state monitored by the memory controller is represented by the number of memory locations in free memory being less than a predetermined memory threshold, the memory counter can be used to enumerate the number of memory locations remaining in free memory or consumed in committed memory. The analysis register can be used to parse a received message, and extract the release message therefrom. A mapper, such as a translation lookaside buffer, can translate the release identifier, which may be a logical value, into a physical memory location of a transmitted message copy associated with the release identifier. The mobile communication device also may include a transceiver through which the local process bidirectionally communicates messages over a communications network with the remote process using a preselected wireless communication protocol.

The message protocol used between hosts may be an end-to-end communication protocol. Moreover, the message protocol may be a positive acknowledgement-based, end-to-end communication protocol, wherein protocol acknowledgements contain message identifiers defined over a numerical sequence. Where the message is a TCP segment, the message may have a header and a payload. A transmitted message and copy may have a transmitted message identifier in the header; and a received message header may have a received message identifier. The received message identifier in a TCP segment can be an Acknowledgement Number (ACKNUM) having a defined relationship with a selected transmitted message copy. If the memory controller determines that the communication buffer is in a predetermined buffer state, the received message identifier may be designated as a release identifier. The transmitted message identifiers may be defined over a numerical sequence. A release identifier may be selected from a message identifier in the numerical sequence, e.g., an ACKNUM, corresponding to a transmitted message received by the remote host. The memory controller may denominate, as free transmit memory, the committed transmit memory corresponding to a selected transmitted message copy, associated with the release identifier. The release identifier also may be associated with a block of committed transmit memory locations. In such a case, the memory controller may denominate, as free transmit memory, the block of committed transmit memory corresponding to a block selected transmitted message copies, associated with the release identifier. When used to identify unacknowledged transmitted message copies in committed transmit memory, a transmitted message identifier (ACKNUM) of a selected transmitted message copy may have an ordinality less than the ordinality of a received message identifier (ACKNUM), and may be designated as a release identifier by the memory controller.

The communication buffer further may be allocated into a receive buffer, having a predetermined number of receive memory locations including committed receive memory, free receive memory, or a combination thereof. The memory controller also can monitor the receive buffer, storing received messages in the receive buffer in selected free receive memory, which the memory controller can denominate as committed receive memory. If the memory controller determines that the communication buffer may be in a predetermined buffer state, a received message identifier may be extracted from the received message and may be designated a release identifier. The received message may not be acknowledged and the payload from the received message may be discarded. The device also may include a transceiver connected with the communication buffer so that the local process can bidirectionally communicate messages through the transceiver with the remote process.

BRIEF DESCRIPTION OF THE DRAWINGS

The present invention will be more fully understood from the following detailed description of the embodiments thereof, taken together with the following drawings, wherein.

DETAILED DESCRIPTION OF THE EMBODIMENTS

Figure 1:
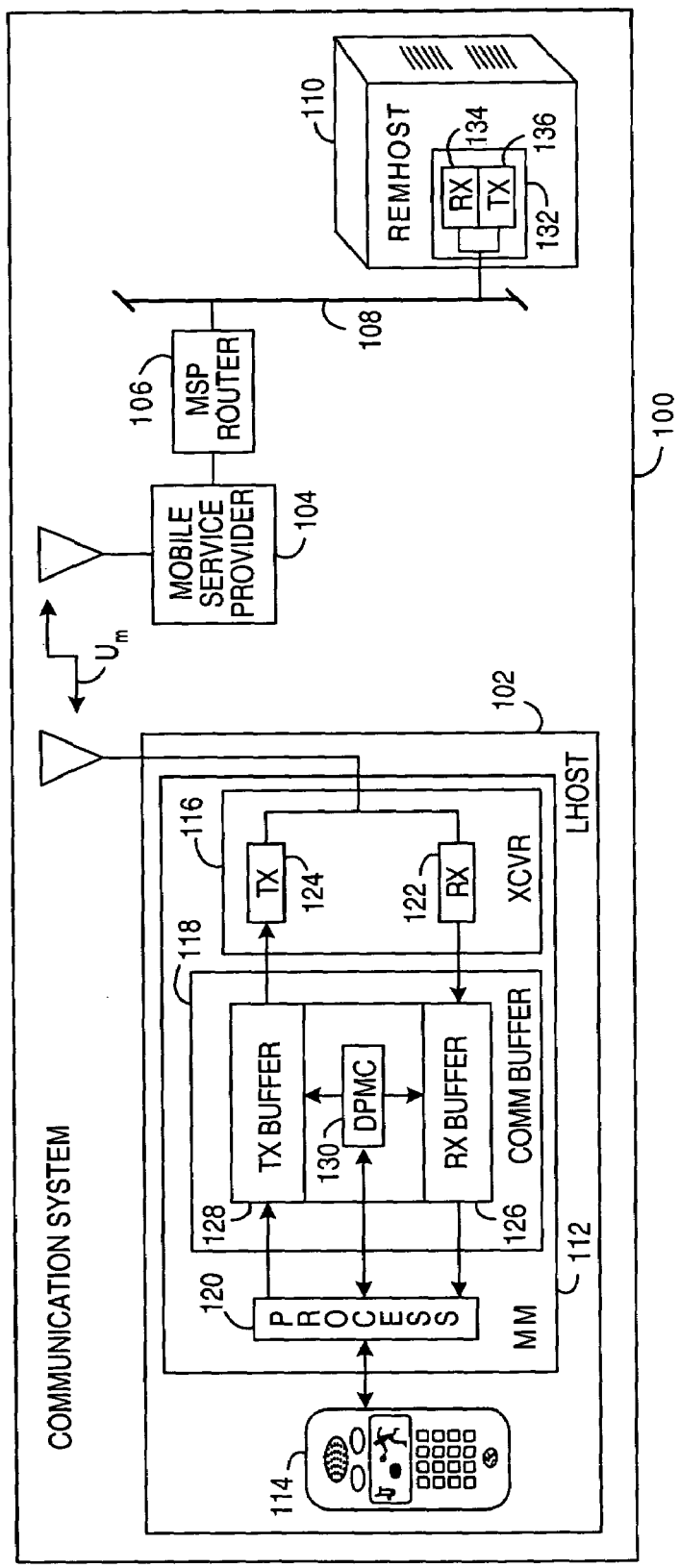
FIG. 1 is a simplified schematic block diagram illustrating an embodiment of a communication buffer manager in the context of a communication system.

The embodiments herein provide differential acknowledgement processing (d-ACK) methods and apparatus for managing a mobile device communications buffer in a mobile communications device. Although the exemplary methods and apparatus herein may present differential acknowledgement processing (d-ACK) in the context of memory-constrained mobile wireless devices, these methods and apparatus may be implemented in a vast array of devices, systems, and environments.

1. Definition of Terms

As used herein, a message may be an exemplary data unit transferred during a communication between two communication endpoints, or hosts. The constituent components of a message may be one or more data units, such as a TCP segment (segment). A TCP segment can include a TCP header and a TCP data payload (header and payload, respectively). Further, a message may be one or more data units of video, audio, text, data, multimedia, and other content, significant to a host or a user of the host, including retransmissions and control messages. Messages may be formed of one or more data units, including, without limitation, data frames, packets, datagrams, delimited streams, administrative responses, and communication control data. Control messages may be in the form of positive or negative acknowledgements, status updates, requests, replies, and the like. The term message also can comprehend communicated responses or communication control data, including, for example, an acknowledgement (ACK), an ACK sequence number (or ACKNUM), and the like.

In general, a memory buffer, or simply, a buffer, can be apportioned from one or more memory blocks. Each memory block can be apportioned, in turn, from one or more unit memory locations. The number of unit memory locations constituting a memory block, as well as the number of memory blocks constituting a memory buffer may be fixed, selectable, variable, or a combination thereof. A fixed value may be a single value, and typically assigned in advance of operations. A selectable value can be drawn from a discrete set of values, and often may be assigned in advance of operations. A variable value may assume a value usually within a predetermined range, which may be assigned dynamically or during operations. Memory locations, memory blocks, and memory buffers all may be termed memory objects, unless the context calls for a specific memory entity. A buffer may be a single memory object and also may be apportioned from multiple, smaller memory objects.

Accordingly, a system memory buffer logically may contain a fixed number of smaller functional buffers, each effectively formed from a fixed number of unit memory locations. In the alternative, a system memory buffer may contain an aggregation of fixed-, selectable-, and variable-sized memory objects of differing size, which may be adapted to suit a particular purpose, to minimize wasted memory space, and the like. For example, all communication interface control structures may be allocated a memory object of one predetermined size, whereas a communication buffer may be composed of memory objects of different sizes, with an object size being adapted to facilitate efficient communication. The available physical communication memory space may be formed from or within a single integrated device, or from or within multiple integrated or discrete physical memory devices or modules. Furthermore, where advantageous hierarchical, distributed, or shared memory object configuration may be used.

Also as used herein, a "memory constrained" device may be a device having a limited memory space, or number of memory locations, available for use as a communications buffer. Memory constraints in a compact, mobile communications device may arise, for example, from power, cost, or device size considerations. In the examples and embodiments that follow, the terms "local" and "remote" may be used to provide relative reference points, and not to assign a particular physical or spatial relationship between communicating hosts. Also, the term "free" and "committed" as applied herein to memory entities, including memory locations, buffers, and devices, respectively designate the memory entity as being in a state substantially corresponding to one of a "write-enable" state and "write-inhibit" state. A memory entity designated write-enabled may allow new data to be stored. In write-inhibited memory, new data storage is temporarily prevented. It is desirable that a communication buffer consist of free memory and committed memory.

Within the context of this disclosure, memory management can be effected by hardware, software, or a combination thereof. Memory management can include selectively allocating memory resources for the storage of information, and may implement one or more memory allocation policies to provide sufficient resources to satisfy allocation requests expected during communications. Memory allocation policies well-known in the computer arts may be used, including without limitation, memory mapping and re-mapping, static memory allocation, dynamic memory allocation, and hybrid allocation, which can be a combination thereof.

2. Discussion of Embodiments

FIG. 1 illustrates communication system 100, in which local host (LHOST) 102 communicates with remote host (REMHOST) 110. LHOST 102 can be a mobile wireless system, which communicates over the physical air ($U_m$) interface with mobile service provider (MSP) 104, using a predetermined wireless protocol. MSP 104 can subsume a base transceiver station (not shown) and a mobile switching center (not shown), and can be connected through MSP router 106 to network 108. MSP router 106 may perform physical signal and logical message transformations, as desired, between network 108 and MSP 104. Network 108 can be representative of a heterogeneous network, with constituent network portions including, without limitation, circuit-switched networks, packet-switched networks, and equivalents and combinations thereof. Portions of network 108 that include a packet-switched public network, such as the Internet, may use reliable, connection-oriented, end-to-end protocols, such as the TCP/IP protocol suite.

LHOST 102 may incorporate mobile terminal 114, such as a handset, personal digital assistant, or other compact communication device, which may be memory-constrained. LHOST 102 also may use mobile station manager (MM) 112 to facilitate communication between mobile terminal 114 and REMHOST 110. Although MM 112 often can be integrated into mobile terminal 114, it also may be contemplated that MM 112 be an entity separate from mobile terminal 114, as is shown in FIG. 1. MM 112 may be coupled to, or may incorporate, mobile transceiver (XCVR) 116; and may facilitate communication between XCVR 116 and communication process 120, or an associated interface, or service module, such as a TCP process. MM 112 can include one or more communication buffers, such as communication buffer 118. Process 120 may provide networking communication services for a user application executing in mobile terminal 114. It can be within the scope of the inventive embodiments herein for process 120 to execute in MM 112, or in mobile terminal 114, alone or in combination.

Mobile transceiver 116 may include radio receiver 122 and radio transmitter 124. Receiver 122 can receive an incoming wireless message from MSP 104, and can transfer the received message to receive buffer 126. Transmitter 124 can transfer an outgoing message from transmit buffer 128 to MSP 104 over the physical air ($U_m$) interface. Messages across the $U_m$ interface typically may be transferred using a predetermined wireless communication protocol; message transfer may be bidirectional and full duplex. Typically, at the beginning of a communication, processes (e.g., application 120) on REMHOST 110 and LHOST 102 employ selected TCP sockets to negotiate a connection therebetween. Each process may create one or more sockets to effect communication. Communication buffer 118 may be allocated for each socket created in LHOST 102, although two or more sockets may share communication buffer 118, and possibly contend for allocation of memory space. As the TCP connection is being established, communicating TCP processes also may identify port numbers and negotiate other parameters, such as the amount and size of TCP segments to be bidirectionally transferred between REMHOST 110 and LHOST 102. Communication buffer 118 can be allocated into transmit buffer 128, and may be allocated into receive buffer 126. Similarly, in REMHOST 110, communication buffer 132 may be allocated into receive buffer 134 and transmit buffer 136. Although receive buffer 126 and transmit buffer 128 are depicted as being physically separate entities, the distinction also may be virtual. The available communication memory space can be mapped over one or more integrated or discrete physical memory devices or modules.

Outgoing messages received from terminal 114 can be transferred by process 120 into transmit buffer 128, for example, in response to a process BUFFER WRITE operation. Messages in transmit buffer 128 may be transmitted to MSP 104 by transmitter 124. In conjunction with message transmission from LHOST 102 to REMHOST 110, a transmitted message copy can be stored in selected memory location in buffer 128 free memory, and denominated to be in committed memory, pending acknowledgement. As communications between LHOST 102 and REMHOST 110 continue, the amount of free memory in transmit buffer 128, relative to the amount of committed memory, may vary, containing, for example, both outgoing messages received from process 120 and transmitted message copies sent to REMHOST 110.

Where a message includes a payload and a header, the header typically contains a corresponding message identifier. A message identifier, corresponding to a particular message being transmitted from sender host to recipient host, may be a response indicant beneficially adapted to provide a mechanism by which the recipient host may correctly receive, reorder, repair, acknowledge receipt of, and request re-transmission of, the segments, or messages, conveyed from the sender host. As used herein, the term received message identifier can be used to describe a response indicant by which a recipient host can confirm the receipt of selected messages from the sender host.

In bidirectional communications, message flows may be created between hosts communicating over a network. A first message flow may be established between a first host as a sender host, and a second host as a recipient host. A second message flow also may be established between the second host as a sender host, and the first host as a recipient host. To facilitate communications, it may be advantageous to include administrative information in a message. Exemplary administrative information may include a host IP address, a port identifier, error detection indicia, and a message identifier. In some reliable end-to-end message protocols, such as those using positive acknowledgement techniques, the message identifiers associated with a message flow may be indexed in an increasing numerical sequence. A header may include communication administrative information, for example, a respective message identifier. A TCP segment, for example, can consist of a data payload and a header. For a respective message acknowledgement (ACK), a message identifier representative of the sequential position of the respective message within a message flow may be called the acknowledgement number (ACKNUM). An ACKNUM index value may be called ACKNUM ordinality or, simply, Ordinality. Typically, Ordinality increases in relation to the number of messages that are transmitted in a message flow sequence. Thus, a message identifier may be representative of the Ordinality associated with a message ACKNUM, and be indicative of the position of a message within a message flow sequence. In general, a transmitted message identifier may correspond to a message transmitted from sender host to recipient host. Similarly, a received message identifier may correspond to messages successfully received by the recipient host from the sender host. In bidirectional message flows, a range of values, or sequence, for an ACKNUM in a first message flow, for example, from local host to remote host, generally can be different from the ACKNUM sequence used for the second message flow, for example, from remote host to local host.

A sender host may employ a transmitted message identifier to manage message transmission and storage. Such identifiers may be used to identify transmitted messages, which may be stored by the local host, but not yet acknowledged as received by the recipient host. A recipient host may use a transmitted message identifier to manage message reception and to process received data. A recipient host also may use a transmitted message identifier to formulate a received message identifier, which may be included in an ACK reply to the sender host. In the ACK reply, a recipient host may include a received message identifier, representative of an anticipated subsequent message. The received message identifier may be assigned an Ordinality of $ACKNUM_R$ by the recipient host which, when received in an ACK by the sender host, is indicative that the recipient host requests the sender host resume transmission to resume with a message having the Ordinality of $ACKNUM_R$. Implicitly, by replying to the sender host with an ACK bearing a received message identifier having an Ordinality of $ACKNUM_R$, the recipient host confirms receipt of transmitted messages with a received message identifier, having an Ordinality of less than $ACKNUM_R$. Therefore, a received message identifier may have a defined relationship with corresponding transmitted message identifiers of previously transmitted messages, as well as be associated with copies of transmitted messages which may be stored by a sender, but awaiting acknowledgement.

In a communicating host, transmitted messages may be stored in a transmit buffer prior to and after transmission. Similarly, received messages may be stored in a receive buffer after being received and before being processed by an application. The distinction between transmit and receive buffer may be flexible and, during a high-message volume period of communications, available free buffer space may dwindle to near exhaustion. In the event that a received ACK is not processed by a sender host, the sender host may re-transmit stored messages, beginning with a message that follows the last message successfully acknowledged. Retransmission may repeat until an ACK is received and, when a host may be unable to process an incoming ACK, for example, due to exhausted memory locations, the unreceived ACK may lead to a service time-out, loss of connection, and degradation in perceived Quality of Service.

In the exemplary context of LHOST 102 as sender host and REMHOST 110 as recipient host, LHOST 102 may transmit a series of messages to REMHOST 110. In general, before transmission, messages outgoing to REMHOST 110 may be stored in LHOST transmit buffer 128, for example, as TCP segments. Successive messages may be assigned transmitted message identifiers of increasing Ordinality, for example, having an Ordinality of less than $ACKNUM_R$. Outgoing messages may be transmitted from transceiver 116, across the $U_m$ interface to MSP 104, using a preselected wireless communication protocol. Messages received by MSP 104 can be communicated across network 108 to REMHOST 110, through MSP router 106. REMHOST 110 may store the received messages in receive buffer 134 of communication buffer 132. If REMHOST 110 successfully receives messages transmitted by LHOST 102, including a message with a transmitted message identifier having Ordinality of less than $ACKNUM_R$, REMHOST 110 may acknowledge the receipt of the messages by transmitting $ACK_R$ to LHOST 102. By including in $ACK_R$ a received message identifier having an Ordinality of $ACKNUM_R$, REMHOST 110 may confirm receipt of messages having Ordinality of less than $ACKNUM_R$, as well as request a subsequent message in a message flow sequence, for example, with a transmitted message identifier having an Ordinality of $ACKNUM_R$. After being communicated across network 108 from REMHOST 110, MSP router 106 may direct $ACK_R$ to MSP 104, which transmits ACKR over the $U_m$ interface to LHOST 102 using the preselected wireless communication protocol. Radio receiver 122 in LMHOST 102 can detect incoming signals and can convert the physical signals into logical received messages, e.g., TCP segments.

LHOST 102 also may receive messages from REMHOST 110, substantially concurrently with LHOST 102 transmitting messages to REMHOST 110. In general, messages going from REMHOST 110 to LHOST 102 may be stored prior to transmission in REMHOST transmit buffer 134, for example, as TCP segments. The outgoing messages may be transmitted across network 108 and to MSP 104, through MSP router 106. MSP 104 can transmit the messages over the $U_m$ interface to LHOST 102, using the preselected wireless communication protocol. Radio receiver 122 in LMHOST 102 can detect incoming signals and can convert the physical signals into logical received messages, e.g., TCP segments. Successive messages may be assigned transmitted message identifiers of increasing Ordinality, for example, having an Ordinality of less than $ACKNUM_L$. By including in $ACK_L$ a received message identifier having an Ordinality of $ACKNUM_L$, LHOST 102 may confirm receipt of messages having Ordinality of less than $ACKNUM_L$, as well as request a subsequent message in a message flow sequence, for example, with a transmitted message identifier having an Ordinality of $ACKNUM_L$.

Generally, received messages may be stored in receive buffer 126 until process 120 requests selected received information. Responsive to a process BUFFER READ operation, the received payloads stored in receive buffer 126 can be transferred to process 120, and the data can made available for use, for example, by mobile terminal 114. After a BUFFER READ, committed memory in buffer 126 can be denominated as free memory. However, while a BUFFER READ operation is pending, additional messages also may be received from REMHOST 110. As communications between REMHOST 110 and LHOST 102 continue, the amount of free receive memory in receive buffer 126, relative to the amount of committed receive memory, may diminish. The number of available free memory locations also may be reduced where process 120 defers performing a BUFFER READ operation upon receive buffer 128 until an in-progress BUFFER WRITE operation completes. A risk of buffer starvation or buffer deadlock may arise, for example, when process 120 is transferring a large volume of messages to transmit buffer 128, substantially concurrently with receive buffer 126 accepting a large volume of messages transferred from REMHOST 110. Also, process 120 may be configured to defer performing a BUFFER READ operation from buffer 126, until after completing an in-progress BUFFER WRITE operation to buffer 128. With transmit buffer 128 accepting messages from process 120, in addition to retaining copies of messages being transferred to REMHOST 110, the available memory space in communication buffer 118 may begin to dwindle. Inventive embodiments herein may benefit communication buffer memory management by monitoring a predetermined buffer state and, if the state is present, to release sufficient memory to complete a pending, and potentially stalled, operation. In certain embodiments, a response indicant may be obtained from a received message identifier, responsive to the predetermined buffer state. The response indicant may have a defined relationship with unacknowledged transmitted messages, and may be used to denominate, as free memory, selected committed memory locations storing a transmitted message copy. According to the embodiments herein, for example, when a host receives an ACK with an Ordinality of ACKNUM, the host may denominate committed memory locations storing selected transmitted message copies as free memory. It may be beneficial to so denominate a copy of a transmitted message having a respective transmitted message identifier with an Ordinality of less than ACKNUM. The free memory location may advantageously be used, for example, by a new or an existing process, and buffer exhaustion due to ACK-related retention of previously transmitted messages may be mitigated.

It may be desirable that an embodiment of differential processing memory controller (DPMC) 130, or a functional equivalent thereof, provide improved management of memory locations constituting communication buffer 118. The managed memory locations may include transmit buffer 126, receive buffer 118, or both. DPMC 130 may monitor communication buffer 118 for a predetermined buffer state, e.g., the memory locations committed to store unacknowledged transmitted message copies, relative to memory location availability. In response to a predetermined memory state in buffer 118, DPMC 130 may examine a received message, or TCP segment, from REMHOST 110, to determine which committed memory may be released. Conveniently, as stated above, the ACKNUM of the received message can correspond to the ACKNUM of a transmitted message copy and, thus, correspond to the committed memory location in buffer 128 in which the transmitted message copy is stored. The committed memory in transmit buffer 128 (i.e., communication buffer 118) corresponding to one or more transmitted message copies, which may have an ACKNUM Ordinality less than the ACKNUM Ordinality of the received message, may be released and denominated as free memory. It is contemplated that a release of committed memory in transmit buffer 128 may be performed, for example, when a BUFFER WRITE operation to transmit buffer 128 is in progress. The released memory locations may be used, for example, to complete a memory operation, such as a BUFFER WRITE, on transmit buffer 128. Advantageously, by completing a BUFFER WRITE operation on buffer 128, process 120 can proceed to perform a BUFFER READ operation on receive buffer 126, and to release the memory locations in receive buffer 126 thereafter.

Figure 2A:
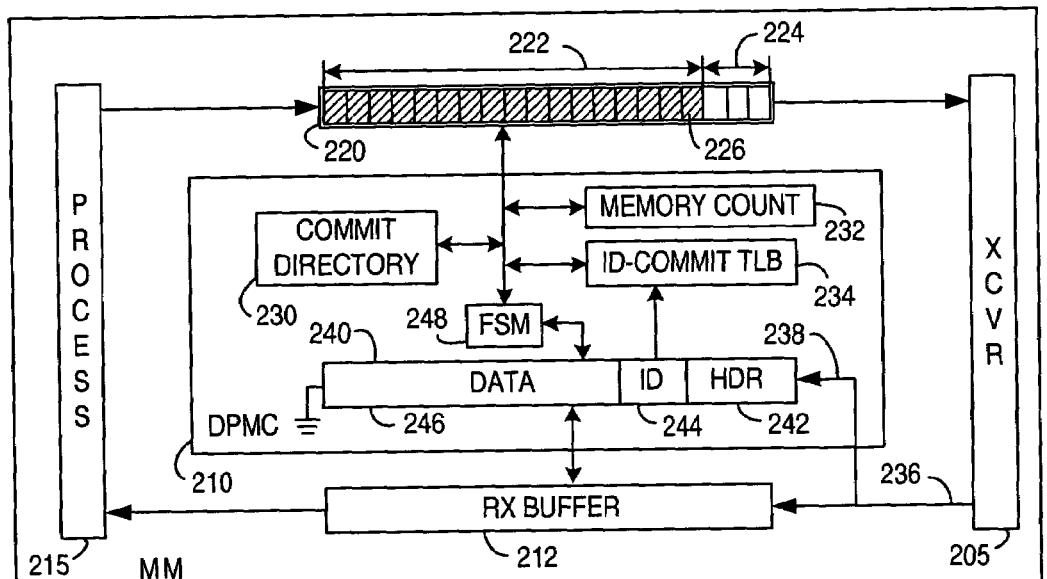
FIG. 2A is a simplified schematic block diagram of another embodiment of a communication buffer manager.
Figure 2B:
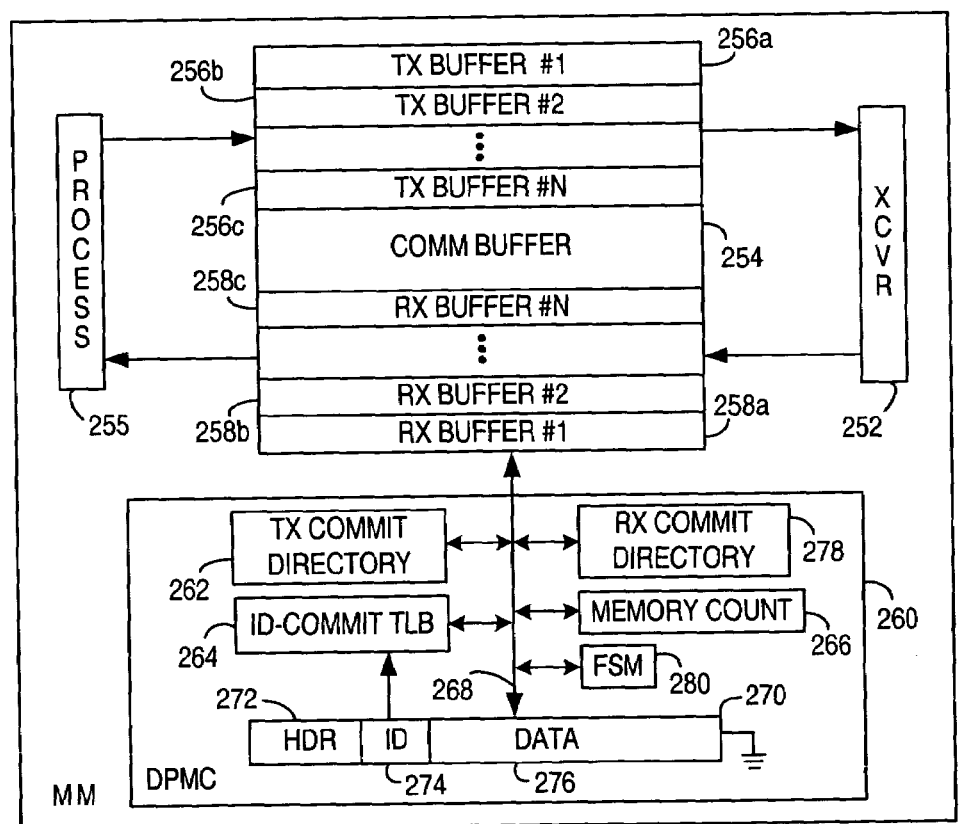
FIG. 2B is a simplified schematic block diagram of still another embodiment of a communication buffer manager.

FIGS. 2A and 2B further illustrate the principles described with respect to FIG. 1. FIG. 2A illustrates MM 200, similar to MM 112 of LHOST 102 in FIG. 1. MM 200 includes therein a simplified emblematic embodiment of differential processing memory controller (DPMC) 210. Similarly, FIG. 2B illustrates MM 250, also similar to MM 112 of LHOST 102 in FIG. 1, which includes therein a simplified emblematic embodiment of differential processing memory controller 270. In FIGS. 2A and 2B, the term "local host" can include respective MM 200 and 250; a "remote host" can be one similar to that represented by REMHOST 110 in FIG. 1. DPMC 210 in FIG. 2A and DPMC 270 in FIG. 2B may be two of many possible implementations of DPMC 130 in FIG. 1. Desirably, both MM 200 and MM 250 perform bi-directional, full-duplex communication with respective hosts (not shown) using a layered hierarchy of communication protocols. Where one of MM 200 and 250 is included in a mobile wireless host device, corresponding XCVR 205, 255 may employ a predetermined wireless communication protocol to communicate across a $U_m$ interface with a corresponding MSP (not shown). It also is desirable that an response-type reliable communication protocol be used, for example, at the network, transport, or application layer level. Conveniently, many acknowledgement-based protocols are well known in the telecommunication arts. As with FIG. 1, the context of FIGS. 2A and 2B is with respect to the well-known TCP/IP protocol in an environment of a memory-constrained mobile communication device. Also, the memory operations described, relative to FIGS. 2A and 2B, can be in the context of MM 200, 250 executing a respective process 215, 255. Process 215, 255 performs a BUFFER READ operation on messages incoming from the remote host, after completing a BUFFER WRITE operation on messages outgoing the remote host.

Turning now to FIG. 2A, MM 200 may include transceiver (XCVR) 205, DPMC 210, and process 215 cooperating to communicate with a remote host (not shown). MM 200 can include a communication buffer which has a predetermined total number of memory locations, including transmit buffer 220, which may be memory constrained. Initially, DPMC 210 may denominate a memory location as a free memory location. Messages from process 215 can be transmitted to the remote host using XCVR 205. It is desirable to store a transmitted message copy of an unacknowledged message, in a free memory location in buffer 220. For example, the most recent transmitted message copy may be stored in memory location 226 of transmit buffer 220. DPMC 210 can denominate the memory location 226 as a committed memory location, temporarily inhibiting subsequent writing to the memory location, for example, until a response from the remote host is received. Advantageously, each transmitted message copy in buffer 220 can be stored in a committed memory location, and can be associated with a transmitted message identifier, for example, a transmitted TCP ACKNUM.

As described relative to FIG. 1, a TCP ACKNUM can be a number having a defined ordinality, i.e., a defined count order or numerical sequence, with TCP segment identifier ordinality generally increasing during the communication. For example, when a recipient receives a message, or TCP segment, having a message identifier with the value of $(X_{ACKNUM}-1)$, the recipient responds with a request for sender to transmit the next message in the sequence, i.e., the segment having a TCP ACKNUM with a value of $(X_{ACKNUM})$. Implicitly, by the request for message $(X_{ACKNUM})$, the recipient confirms to the sender the receipt of previously-transmitted TCP segments having message identifiers with an ordinality of less than $(X_{ACKNUM})$. Therefore, transmitted message copies stored in committed memory 222, which have transmitted message identifiers with an ordinality less than $(X_{ACKNUM})$ may be released.

XCVR 205 can transfer received message 236 sent by the remote host to receive buffer 212. It is desirable that received message 236 have a received message identifier therein, and that the received message identifier have a defined relationship with the transmitted message identifiers corresponding to the transmitted message copies stored in committed memory 222. In response to a predetermined buffer state, DPMC 210 can designate a received message identifier in a received message to be an response indicant, including a release identifier. DPMC 210 also can be configured to identify one or more committed memory corresponding to one or more transmitted message copies having message identifiers associated with the indicant or release identifier; and to denominate the committed memory so identified as free memory. The embodiments herein can use a received identifier to identify at least one transmitted message identifiers, which can be associated with one or more transmitted messages being acknowledged. Advantageously, transmitted message identifiers can correspond to unacknowledged transmitted message copies. The identifiers may be used to identify the committed memory in which particular transmitted message copies may be stored.

In use, DPMC 210 can monitor buffer 220, for example, using commit directory 230 and memory counter 232. If the communication buffer, e.g., transmit buffer 220, is not in a predetermined buffer state, received message 238 may be routinely processed, e.g., stored in receive buffer 212. On the other hand, if the communication buffer is in a predetermined buffer state, received message 238 can be diverted to analysis register 240. A suitable predetermined buffer state for use in exemplary DPMC 210 may be the number of free memory 224 being less than a predetermined memory threshold as may be determined by counter 232. Commit directory 230 can identify which of the memory locations in buffer 220 may be denominated as committed memory 222. Counter 232 may be used to determine the number of memory locations 224 remaining in buffer 220, relative to the predetermined number of memory locations. In the alternative, directory 230 could easily be adapted to track free memory. Similarly, counter 232 instead may track committed memory. In register 240, differentially processed received message 238, a TCP segment, can be parsed into header 242 and payload 246. Received message identifier 244 can be further extracted therefrom, and be designated as the release identifier. Payload 246 may be discarded, with no corresponding ACK message being returned to the remote host, which further may reduce memory demand on the dwindling memory space. The lack of an ACK for received message 238 from the local host can cause the remote host to re-transmit message 238, desirably minimizing data loss. However, a response may be sent, such as a return ACK having the ACKNUM of received message 236 last successfully processed into receive buffer 212.

With respect to exemplary ACKNUM values, where the remote host transmits message 236 to the local host as a TCP segment having a received identifier TCP ACKNUM with an ordinality of $(X_{ACKNUM})$, the remote host implicitly confirms the receipt of previously transmitted messages having transmitted message identifiers having TCP ACKNUM ordinality of $(X_{ACKNUM}-1)$ or less. In the example illustrated above in FIG. 2A, the TCP ACKNUM sequence number $(X_{ACKNUM}-1)$ may be symbolically associated with committed transmit memory location 226, in which the corresponding message is stored. It may be useful to translate release identifier 244, which can be a logical value, into a physical committed memory location, e.g., memory location 226. Such translation can be provided by a logical-to-physical mapping entity, such as translation look-aside buffer (TLB) 234. TLB 234 can receive the release identifier 244, e.g., TCP ACKNUM sequence number, $(X_{ACKNUM}-1)$, and output to commit directory 230 a signal indicative of the physical address of the identified committed memory location 226. Commit directory 230 can denominate memory location 226, now acknowledged, as free memory 224, in response to a state signal from TLB 234.

As indicated above, a response from the remote host may implicitly acknowledge the receipt of a series, or block, of transmitted message copies, as well as a single transmitted message copy. The most recently received message 238 can include a received message identifier 244, which has a defined relationship with the respective transmitted message identifiers of multiple transmitted message copies in committed memory 222. Multiple transmitted message copies may occupy multiple memory locations, or a memory block of committed memory 222. Thus, release identifier 244 can be associated with a memory block, and release identifier 244 can cause commit directory 230 to denominate a block of committed memory as a block of free memory. It may be desirable to use a finite state machine, such as FSM 248, to coordinate the operation of DPMC 210.

In FIG. 2B, MM 250 can include DPMC 260 and communication buffer 254. Advantageously, the memory space disposed in communication buffer 254 may be statically or dynamically allocated, as facilitated by DPMC 260, even though buffer 254 may be memory-constrained, relative to a predetermined number of memory locations. DPMC 260 can be configured to implement d-ACK operations with respect to one or more buffers, such as on transmit buffers 256a–256c. DPMC 260 also can be adapted to provide memory management for transmit buffers 256a–256c, and may provide memory management services for receive buffers 258a–258c, as well. Static and dynamic memory allocation techniques are well known in the arts.

In a statically-allocated memory space, one or more transmit buffers 256a–256c, and one or more receive buffers 258a–258c, may be allocated with fixed sizes and boundaries. Typically, one buffer pair is allocated per local host TCP socket. Fixed sizes and boundaries may be uniform for each buffer allocated, or may be selectable, and can be positioned either in a transmit buffer or in a receive buffer. Also, in statically-allocated memory, DPMC 260 may establish the number of memory locations that may be allocated, for example, prior to the execution of process 255, or the memory configuration may be established, for example, during the design process. In contrast, with dynamically-allocated memory space, memory locations can allocated for selected transmit buffers 256a–256c, receive buffers 258a–258c, or some combination thereof. Allocation may be performed before or after the execution of process 255 commences. Conveniently, DPMC 260 may be configured to allocate memory space at the start of a communication, e.g., in cooperation with an application or upper-layer service process. DPMC 260 also may provide adaptable buffer sizes and boundaries during the execution of process 255, e.g., in response to real-time message flow demands. In one example, DPMC 260 may allocate more memory space to transmit buffer 256a than to receive buffer 258a, for example, during a period when transmit demands exceed receive demands, or when executing a high-bandwidth transmission process. Similarly, DPMC 260 may reallocate more memory space to transmit buffer 256b from transmit buffer 256c, for example, in the event a socket of process 255, associated with transmit buffer 256c, enters a standby state, while another socket of process 255, associated with transmit buffer 256b, engages in high-bandwidth communication with the remote host.

Similar to DPMC 210, DPMC 260 can denominate selected memory locations in communication buffer 254 to be committed transmit memory locations, or be free transmit memory locations, for example, by employing one or more commit directories. DPMC 260 may employ transmit commit directory 262 to identify memory locations corresponding to transmitted message copies associated with unacknowledged messages. DPMC 260 also may employ receive commit directory 278 to identify memory locations in receive buffers 258a–258c of communication buffer 254, which may be denominated as, for example, committed receive memory locations, free receive memory locations, or some combination thereof. Additionally, where communication buffer 254 and DPMC 260 can be configured to provide dynamic memory allocation, free receive memory locations may be dynamically re-allocated to be free transmit memory locations, and vice versa.

In response to a predetermined buffer state, DPMC 260 can differentially process an incoming message as a received message with a received message identifier therein. It is convenient that the predetermined buffer state be, for example, the amount of free memory falling below a predetermined memory threshold. This memory amount may be determined using memory location counter 266. Typically, MM 250 accepts a received message via XCVR 252. If communication buffer 254 is NOT the predetermined buffer state, message 268 can be stored in selected free receive memory in buffer 258a–258c. In certain embodiments the predetermined buffer state may include substantial exhaustion of free memory in a buffer 256a–256c. However, if the predetermined buffer state exists in communication buffer 254, DPMC 260 can admit message 268 here, a segment, to analysis register 270, and can parsed the segment into header 272 and payload 276. A received message identifier, which may be in header 272, can be extracted from header 272 and be designated as a release identifier.

Similar to DPMC 210 in FIG. 2A, release identifier 274 can be used by DPMC 260 in FIG. 2B to identify one or more associated transmitted message copies in committed memory. Where it is useful to provide translation between release identifier 274 and the physical address of the associated transmitted message copies, a mapper such as TLB 264 may translate release identifier 274 into a release signal. In response to the release signal from TLB 264, TX commit directory 262 may identify and denominate as free memory, the committed transmit memory in which the transmitted message copies, associated with release identifier 274, may be stored. TLB 264 can be but one of many devices and techniques suitable for mapping or translation. Where multiple memory locations (blocks) are associated with release identifier 274, a release signal also may be supplied to transmit commit directory 262, by which one or more associated blocks of committed memory can be denominated to be free memory. Such differential processing of an acknowledgement can be desirable, for example, to free sufficient memory in a transmit buffer, such as buffer 256a–256c, during a BUFFER WRITE operation in which memory locations in communication buffer 254 may be tending toward exhaustion. By completing an in-progress BUFFER WRITE operation on transmit buffer 256a–256c, process 255 can be permitted to perform BUFFER READ operations on associated receive buffers 258a–258c.

Although shown as discrete entities, some or all of the functions of commit directory 230, 262, 278, free memory location counter 232, 266, TLB 234, 264, analysis register 240, 270, and FSM 248, 280, may be integrated, differentiated, added, deleted, or otherwise modified to produce the desired result.

Figure 3:
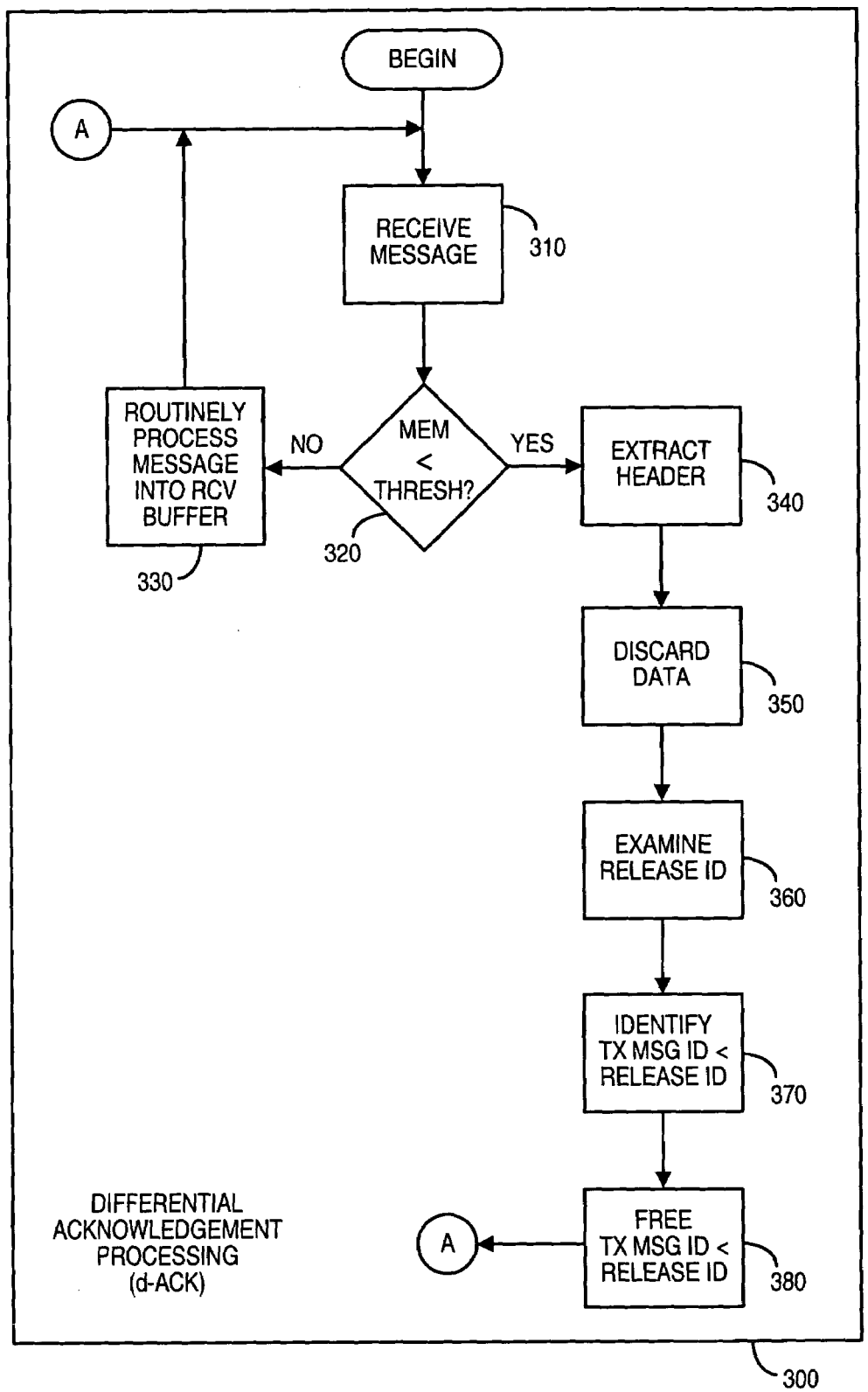
FIG. 3 is a simplified flow diagram illustrating an embodiment of a differential processing memory management process, according to the present invention.

FIG. 3 illustrates an embodiment of differential acknowledgement process (d-ACK) 300, for example, as may be used in a memory-constrained mobile host. Exemplary process 300 can be employed for response-type reliable communication between a mobile host and a remote host, such as positive acknowledgement, TCP-based communication between respective exemplary hosts LHOST 102 and REMHOST 110 in FIG. 1. Process 300 also may be implemented in whole or in part in DPMC 210 in FIG. 2A and DPMC 260 in FIG. 2B. The mobile host (not shown) can proceed with d-ACK process 300 by receiving a message, e.g., a TCP segment, from the remote host (Operation 310), and determining whether the communication buffer is in a predetermined buffer state (Op. 320). In one such state, for example, the number of free communication buffer memory locations in a TCP buffer may be below a predetermined memory threshold. If the communication buffer is NOT in the predetermined buffer state, the message may be processed in a conventional way (Op. 330). However, when the predetermined buffer state exists in the communication buffer, process 300 may continue by extracting the received header from the received message, e.g., extracting the TCP header within the TCP segment (Op. 340). The predetermined buffer state may include, for example, the number of free communication buffer memory locations being less than a predetermined memory threshold. Typically, a received message can composed of a payload and a header containing a received message identifier. Conveniently, process 300 can discard the TCP data payload corresponding to the received TCP segment (Op. 350), without providing the remote host with a response to receiving the message. In the present example, by not sending an acknowledgement, the remote host retransmits the received message, desirably minimizing data loss. Process 300 can continue by examining the header to identify the received message identifier (e.g., the Acknowledgement Number of the received TCP segment) and by designating the received message identifier as the release identifier (Op. 360). A release identifier, e.g., ACK-NUM, implies that the remote host confirms receipt of messages having a transmitted message identifiers with an Ordinality of less than the release identifier. Thus, the mobile host can use the release identifier to identify committed memory corresponding to one or more transmitted message copies having message identifiers associated with the release identifier (Op. 370). Here, the transmitted message identifiers can have a defined relationship with the received message identifier and, thus, the committed memory storing the transmitted message copies, now acknowledged, can be associated with the release identifier. In other words, the ordinality of the ACKNUMs of respective transmitted TCP segment copies may be less than the Ordinality of the ACKNUM of the received TCP segment, which can be designated as the release identifier. The memory location(s) thus identified can be denominated to be free memory, and the associated memory locations released for use (Op. 380). Process 300 may continue by the mobile host receiving another incoming message, or TCP segment (Op. 310). Alternatively, the predetermined buffer state may be represented by the free communication buffer memory locations in a buffer being above a predetermined memory threshold, with the appropriate adaptations made.

Of course, a skilled artisan would realized that the structures described in FIG. 1, FIG. 2A, and FIG. 2B, as well as the operations implementing process 300 in FIG. 3, are expository and intended only to exemplify the inventive principles herein. Thus, the exemplary entities illustrated by FIG. 1, FIG. 2A, FIG. 2B, and FIG. 3 may be directly or indirectly realized, wholly or in part, in hardware, in software, or in an operable combination thereof. Furthermore, one or more such entities may be an operable result of devices and functions distributed throughout a MM (e.g., MM 112, MM 200, MM 250), a local host (e.g., LHOST 102), or a communication system (e.g., communication system 100). The exemplary methods and apparatus herein can be described within the context of the hierarchical, multilayer, TCP/IP transport/network layer protocol suite. They also may be used to provide message delivery between hosts employing other direct or indirect response-type communication protocols, including, without limitation, acknowledgement-based communication protocols. Exemplary acknowledgement-based protocols adaptable for differential processing may include: positive acknowledgement; negative acknowledgement; lost acknowledgement; delayed acknowledgement; subsumed acknowledgement; link keep-alive signal; request for acknowledgement (polling); flow control; protocol negotiation; dynamic link quality adjustment; and error correction.

Many substitutions, modifications, alterations and equivalents may now occur and be made by those having ordinary skill in the art, without departing from the spirit and scope of the invention. Therefore, it must be understood that the illustrated embodiments have been set forth only for the purposes of example, and that it should not be taken as limiting the invention as defined by the following claims. The following claims are, therefore, to be read to include not only the combination of elements which are literally set forth but all equivalent elements for performing substantially the same function in substantially the same way to obtain substantially the same result. The claims are thus to be understood to include what is specifically illustrated and described above, what is conceptually equivalent, and also what incorporates the idea of the invention.

What is claimed is:

1. A method for managing a communication buffer in a local host communicating with a remote host, the method comprising:
    a. receiving from the remote host a received message having a received message identifier therein;
    b. determining whether the communication buffer is in a predetermined buffer state, the communication buffer including one of committed memory, free memory, and a combination thereof, a portion of committed memory storing a transmitted message copy;
    c. if the communication buffer is in a predetermined buffer state, then storing the received message;
    d. if the communication buffer is not in a predetermined buffer state, then designating the received message identifier as a release identifier; and
    e. denominating as free memory the portion of committed memory storing the transmitted message copy associated with the release identifier.

2. The method of claim 1, wherein the predetermined buffer state comprises free memory being less than a predetermined memory threshold; wherein the transmitted message copy includes a corresponding transmitted message identifier characterized by a defined relationship with the release identifier.

3. The method of claim 1, wherein the received message includes a header and a payload, and further comprising extracting the received message identifier from the header of the received message.

4. The method of claim 3, wherein the received message and the transmitted message copy comprise Transmission Control Protocol segments.

5. The method of claim 2, wherein the portion of committed memory stores transmitted message copies, each of the transmitted message copies includes a corresponding transmitted message identifier, and selected corresponding transmitted message identifiers are characterized by the defined relationship with the release identifier; wherein the defined relationship comprises ordinality of selected corresponding transmitted message identifiers being less than ordinality of the release identifier; and wherein the portion of committed memory storing transmitted message copies having the selected corresponding transmitted message identifiers is denominated as free memory.

6. The method of claim 5, wherein receiving from the remote host the received message wherein the message protocol further comprises a reliable response-type end-to-end message protocol.

7. The method of claim 6, wherein the reliable response-type end-to-end message protocol comprises a positive acknowledgement-based protocol.

8. The method of claim 7, wherein the positive acknowledgement-based protocol comprises a Transmission Control Protocol-based protocol, and wherein the received message and the transmitted message copies comprise Transmission Control Protocol segments.

9. The method of claim 8, wherein the release identifier comprises a received message acknowledgement number, wherein selected corresponding transmitted message identifiers comprise selected corresponding transmitted message acknowledgement numbers, wherein the received message acknowledgement number and the selected transmitted message acknowledgement numbers are arranged in a defined acknowledgement number sequence, and wherein ordinality of the received message acknowledgement number is greater than ordinality of the selected corresponding transmitted message acknowledgement numbers.

10. A mobile communication device, comprising:
  a. a communication buffer including one of committed memory, free memory, and a combination thereof; and
  b. a memory controller controllably connected with the communication buffer, and adapted to denominate a selected memory location as one of free memory and committed memory;
  wherein the selected memory location is denominated as free memory and wherein a transmitted message copy is stored in the selected memory location;
  wherein the memory controller denominates the selected memory location as committed memory responsive to the transmitted message copy being stored therein; and
  wherein the transmitted message copy contains a transmitted message identifier discernable to the memory controller to denominate the selected memory location as one of committed memory and free memory responsive to a response indicant.

11. The mobile communication device of claim 10, wherein the communication buffer further comprises a transmit buffer having one of committed transmit memory, free transmit memory, and a combination thereof;
  wherein selected transmit memory locations are denominated by the memory controller as free memory, wherein transmitted message copies of transmitted messages communicated to a remote host are stored in the selected transmit memory locations, and wherein the selected transmit memory locations are denominated as selected committed transmit memory locations responsive to the copies being stored;
  wherein the memory controller monitors the transmit buffer for a predetermined buffer state;
  wherein the response indicant is a received message identifier communicated from the remote host in a received message and is associated with the selected committed transmit memory locations; and
  wherein, if the predetermined buffer state exists, the received message identifier causes the memory controller to denominate selected committed transmit memory locations as free memory.

12. The mobile communication device of claim 11,
  wherein the mobile communication device comprises a local host executing a local communications process and the remote host executes a remote communications process in communication with the local process;
  wherein the local communications process and the remote communications process are bidirectional, reliable, response-type, end-to-end communication processes;
  wherein the transmitted message copies and received message each comprise a payload and a header, wherein headers of the transmitted message copies include respective corresponding transmitted message identifiers, and wherein the header of the received message includes a received message identifier; and
  wherein the received message identifier has a defined relationship with the respective corresponding transmitted message identifiers.

13. The mobile communication device of claim 12,
  wherein the local and remote processes comprise Transport Control Protocol (TCP) processes;
  wherein the transmitted message copies and the received message comprise TCP segments;
  wherein the transmitted message identifiers and the received message identifier are TCP acknowledgement numbers (ACKNUM); and
  wherein the defined relationship comprises ACKNUM arranged in an ordered numerical sequence in which ordinality of the transmitted message identifiers is less than ordinality of the received message identifier.

14. The mobile communication device of claim 13, wherein the predetermined buffer state comprises free transmit memory being less than a predetermined memory threshold.

15. The mobile communication device of claim 14, wherein the communication buffer further comprises a receive buffer having a predetermined number of receive memory locations including one of committed receive memory locations, free receive memory locations, and a combination thereof,
  wherein received messages communicated from the remote process are stored in selected free receive memory locations in the receive buffer with the selected free receive memory locations being denominated as selected committed receive memory locations thereby,
  wherein the local process transmits an acknowledgement of a received message;
  wherein the receive buffer is monitored by the memory controller, and
  wherein the received message identifier corresponds to one of the selected committed transmit memory locations.

16. The mobile communication device of claim 14, wherein the data payload is unused and the local process does not transmit to the remote process the acknowledgement of a received release message.

17. The mobile communication device of claim 10, wherein the communication buffer further comprises transmit buffers each having one of committed transmit memory, free transmit memory, and a combination thereof;
   wherein respective selected transmit memory locations in respective selected transmit buffers are denominated as free transmit memory by the memory controller;
   wherein selected transmitted message copies of selected transmitted messages communicated to a remote host are stored in the respective selected transmit memory locations;
   wherein the selected transmit memory locations are denominated as committed transmit memory locations when the copies are stored;
   wherein the selected committed transmit memory locations are associated with respective response indicants, and each of the respective response indicants comprises a respective received message identifier communicated from the remote host in a respective received message;
   wherein the memory controller monitors each of the transmit buffers for a respective predetermined buffer state; and
   wherein, if the respective predetermined buffer state exists, the respective received message identifier causes the memory controller to denominate the selected committed transmit memory locations as free memory.

18. The mobile communication device of claim 16, further comprising a transceiver connected with the communication buffer, the local process bidirectionally communicating messages through the transceiver with the remote process.

19. The mobile communication device of claim 18, wherein the transceiver communicates with the remote process using a preselected wireless communication protocol.

20. The mobile communication device of claim 19, wherein at least a portion of the communication network over which the local process communicates with the remote process comprises a public packet-switched network.

21. A communication method for a mobile, memory-constrained local host, the method comprising:
   a. transmitting transmitted messages from a local host communicating to a remote host using a preselected reliable, end-to-end communication protocol;
   b. storing, in selected memory locations of a memory-constrained local host communication buffer, copies of the transmitted messages, each transmitted message copy including a respective transmitted message identifier therein, the communication buffer containing a predetermined number of memory locations denominated as one of committed memory, free memory, and a combination thereof, and the selected memory location being in free memory;
   c. denominating selected memory locations to be in committed memory responsive to the storing;
   d. receiving from the remote host a received message having a received message identifier therein;
   e. monitoring a communication buffer status for a predetermined buffer state;
   f. if the communication buffer status is in the predetermined buffer state, then storing the received message in the communication buffer;
   g. if the communication buffer is not in the predetermined buffer state, then releasing the communication buffer to the predetermined buffer state, wherein the releasing includes:
      (1) designating the received message identifier as a release identifier;
      (2) denominating as free memory, committed memory in which a transmitted message identifier corresponds to the release identifier.

22. The method of claim 21, wherein the communication buffer status comprises the amount of committed memory being below a preselected committed memory threshold.

23. The method of claim 22, wherein the received message comprises a header and a payload, and further comprising extracting the received message identifier from the header of the received message, the received message identifier having a defined relationship to a transmitted message identifier in a transmitted message copy stored in committed memory.

24. The method of claim 23, wherein the preselected reliable end-to-end communication protocol for communicating between the local host and the remote host comprises a preselected reliable positive acknowledgement-based end-to-end communication protocol, wherein protocol acknowledgements contain message identifiers defined over a numerical sequence.

25. The method of claim 24, wherein transmitted message identifiers are defined over the numerical sequence and the release identifier is selected from one message identifier in the numerical sequence corresponding to one of the transmitted messages received by the remote host.

26. The method of claim 25, wherein the preselected reliable positive acknowledgement-based end-to-end communication protocol comprises a TCP protocol.

27. The method of claim 21, wherein the preselected end-to-end communication protocol for the local host communicating to the remote host comprises a reliable, positive acknowledgement-based, end-to-end TCP communication protocol, wherein transmitted message identifiers are defined over a numerical sequence and wherein a protocol acknowledgement contains a release identifier selected from the numerical sequence corresponding to one of the transmitted messages received by the remote host.

28. The method of claim 27, wherein the local host communicates with the remote host over the $U_m$ interface, and wherein the preselected end-to-end communication protocol further comprises a preselected wireless communication protocol.

29. A telecommunication method, comprising:
   a. receiving, from a remote host by a local host, an acknowledgement having an acknowledgement sequence number, the acknowledgement sequence number indicating to the local host a next selected message to transmit to the remote host and a selected previously unacknowledged message received by the remote host, the selected previously unacknowledged message being stored in a selected memory location in a communication buffer and the selected memory location being reversibly write-inhibited;
   b. monitoring the communication buffer for a predetermined buffer state; and
   c. if the communication buffer is in the predetermined buffer state, then reversibly write-enabling the selected memory location in which the selected previously unacknowledged message indicated by the acknowledgement sequence number is stored.

30. A communication system, comprising:
   a. memory adapted to buffer copies of ordered messages transmitted to a remote device over a packet-switched network;

wherein unacknowledged copies are buffered in memory denominated as committed memory, the committed memory being reversibly write-inhibited;

wherein the remote device returns an acknowledgement of the ordered messages received by the remote device over the packet-switched network, wherein the acknowledgement includes a response indicant acknowledging a selected ordered message in the communication; and b. a differential processing memory controller configured to examine the response indicant, responsive to a preselected memory state, wherein the response indicant acknowledges copies in selected committed memory, wherein the memory controller denominates selected memory associated with the response indicant as free memory, the free memory being reversibly write-enabled; and wherein the memory and differential processing memory controller are constituents of a mobile wireless communication device.

31. The communication system of claim 30, wherein the ordered messages are transmitted to the remote device over the packet-switched network using a reliable, positive acknowledgement-based, end-to-end communication protocol.

32. The communication system of claim 31, wherein the end-to-end communication protocol comprises a TCP communication protocol.

33. The communication system of claim 30, wherein the differential processing memory controller further comprises:

a. a counter connected with the memory, wherein the memory includes a constrained number of memory locations, wherein the ordered messages are arranged in a defined numerical sequence, wherein the preselected memory state is indicative of free memory locations being fewer than a predetermined free memory threshold, and wherein the counter provides a first state signal declarative of the preselected memory state; and b. a commit directory connected with the memory and receiving the first state signal, the commit directory configured to denominate each of the constrained number of memory locations as one of a free memory and a committed memory, the commit directory denominating the selected memory as committed memory when unacknowledged copies are buffered therein and, responsive to the state signal, as free memory.

34. The communication system of claim 33, wherein the differential processing memory controller further comprises a mapper configured to receive the response indicant and adapted to produce in response a second state signal, wherein the commit directory denominates the selected memory of committed memory as free memory, further responsive to the second state signal.

35. The communication system of claim 31, wherein the differential processing memory controller is adapted to statically allocate committed memory and free memory.

36. The communication system of claim 31, wherein the differential processing memory controller is adapted to dynamically allocate committed memory and free memory.

* * * * *